United States Patent
Cao

(10) Patent No.: US 11,107,451 B2
(45) Date of Patent: Aug. 31, 2021

(54) METHOD FOR PREPARING SOUND-ADSORBING MATERIAL AND SOUND-ADSORBING MATERIAL

(71) Applicant: Goertek Inc., Weifang (CN)

(72) Inventor: Xiaodong Cao, Weifang (CN)

(73) Assignee: Goertek Inc., Weifang (CN)

( * ) Notice: Subject to any disclaimer, the term of this patent is extended or adjusted under 35 U.S.C. 154(b) by 517 days.

(21) Appl. No.: 16/076,693

(22) PCT Filed: Dec. 17, 2015

(86) PCT No.: PCT/CN2015/097758
§ 371 (c)(1),
(2) Date: Aug. 8, 2018

(87) PCT Pub. No.: WO2017/035987
PCT Pub. Date: Mar. 9, 2017

(65) Prior Publication Data
US 2019/0051280 A1    Feb. 14, 2019

(30) Foreign Application Priority Data
Sep. 6, 2015    (CN) .......................... 201510560252.4

(51) Int. Cl.
*G10K 11/162*    (2006.01)
*B01J 2/00*    (2006.01)
*B01J 2/06*    (2006.01)

(52) U.S. Cl.
CPC .............. *G10K 11/162* (2013.01); *B01J 2/00* (2013.01); *B01J 2/06* (2013.01)

(58) Field of Classification Search
CPC .................................. G10K 11/162; B01J 2/06
See application file for complete search history.

(56) References Cited

FOREIGN PATENT DOCUMENTS

| | | | |
|---|---|---|---|
| CN | 102321307 A | | 1/2012 |
| CN | 103100418 | * | 5/2013 |
| CN | 103100418 A | | 5/2013 |
| CN | 104549553 A | | 4/2015 |
| CN | 204350278 U | | 5/2015 |
| CN | 204498347 U | | 7/2015 |
| JP | 4369690 B2 | | 11/2009 |

OTHER PUBLICATIONS

Translation for CN 103100418, May 2013.*
WIPO, International Search Report dated Jun. 8, 2016 for PCT international application No. PCT/CN2015/097758.
WIPO, Written Opinion of the International Search Authority dated Jun. 8, 2016 for PCT international application No. PCT/CN2015/097758.

* cited by examiner

*Primary Examiner* — C Melissa Koslow
(74) *Attorney, Agent, or Firm* — Houtteman Law LLC

(57) ABSTRACT

The present invention relates to a method for preparing a sound-adsorbing material and a sound-adsorbing material. The method includes the following steps: S1, preparing a non-foaming material slurry and mixing the slurry uniformly; S2, forming the non-foaming material slurry by using an oil column forming method to form wet granules; S3, drying the wet granules to form dry granules; and S4, roasting the dry granules to form sound-adsorbing material granules. The method has the advantages of simple operation and high reliability. The formed granules can have a uniform size, a smooth surface and high sphericity, and the granules are in contact with each other in points and piled up uniformly, which can reduce the bed resistance.

12 Claims, 2 Drawing Sheets

METHOD FOR PREPARING SOUND-ADSORBING MATERIAL AND SOUND-ADSORBING MATERIAL

CROSS-REFERENCE TO RELATED APPLICATIONS

This application is a National Stage of International Application No. PCT/CN2015/097758, filed on Dec. 17, 2015, which claims priority to Chinese Patent Application No. 201510560252.4, filed on Sep. 6, 2015, both of which are hereby incorporated by reference in their entireties.

TECHNICAL FIELD

The present invention relates to the technical field of material preparation, and more particularly to a method for preparing a sound-adsorbing material and a sound-adsorbing material.

BACKGROUND

In recent years, as wearable electronic products have become thinner and lighter, conventional sound-adsorbing materials have been unable to meet the requirements of the speaker (SPK) industry for adjusting the acoustic performance. In response to this situation, new sound-adsorbing materials have been continuously developed and tried. After verification, it was found that placing porous sound-adsorbing materials in a rear cavity of a speaker device can effectively improve acoustic performance. At present, such sound-adsorbing materials having good application effects include natural zeolite, activated carbon, white carbon, or zeolite powder having a silica-alumina mass ratio of 200 or more, or a mixture thereof. In the speaker application, for the quantification and feasibility of process filling, the above powdery sound-adsorbing materials need to be first prepared into granules with a granule size of 0.10 to 10 mm. According to the rear acoustic cavity size and structure of the speaker product, the granule size floats in a small interval ranging from 0.10 mm to 10 mm.

The traditional granulation methods are extrusion, boiling granulation, rolling into ball and spray drying. The extrusion method, the boiling granulation method, and the rolling into ball method have poor granule strength, poor sphericity, non-smooth surface, non-uniform granule size, limited physical structure and performance, and small main pore volume and pore size. The granules formed by spray drying are relatively small and have non-uniform granule size distribution. In the traditional granulation methods, the obtained granules have a large granule size distribution range and poor sphericity, the granules are piled up non-uniformly and rather tightly, and it is difficult to constitute unobstructed pores between granules, resulting in a substantial increase in the mass transfer resistance of the sound-adsorbing module as a whole. The high-frequency airflow generated during the operation of the speaker (SPK) product is difficult to smoothly enter and exit from the sound-adsorbing member formed by the sound-adsorbing material granules, which reduces the effective use of the sound-adsorbing member and makes it difficult to achieve an ideal acoustic performance tuning effect.

SUMMARY

An object of the present invention is to provide a new technical solution for a method for preparing a sound-adsorbing material.

According to a first aspect of the present invention, there is provided a method for preparing a sound adsorbing material. The preparation method includes the following steps: S1, preparing a non-foaming material slurry and mixing the slurry uniformly; S2, forming the non-foaming material slurry using an oil column forming method to form wet granules; S3, drying the wet granules to form dry granules; and S4, roasting the dry granules to form sound-adsorbing material granules.

Preferably, the non-foaming material slurry includes a binding agent, a non-foaming powder material, a template agent, and an activated carbon fiber.

Preferably, the non-foaming powder material is one or more of natural zeolite powder, white carbon black, activated carbon powder or molecular sieves.

Preferably, the effective solid content of the binding agent accounts for 1-35% by mass of the non-foaming material slurry.

Preferably, the mass ratio of the template agent is larger than 0 and equal to or less than 12%; the mass ratio of the activated carbon fiber is 0.1-15%, and the length of the activated carbon fiber is 0.15-15 mm.

Preferably, the forming oil used in the oil column forming method is one of lubricating oil, stator oil, machine tool oil, vacuum pump oil and edible oil, or the forming oil is a mixture of lubricating oil and aliphatic hydrocarbon.

Preferably, in the step S2, the oil temperature of the forming oil is 40-120° C.; in the step S3, the drying is carried out in air or an inert gas, the drying temperature is 40-150° C., and the drying time is 0.5-96 h; and in the step S4, the roasting temperature is 120-850° C., the heating rate is 20-120° C./h, and the roasting time is 0.5-96h.

According to another aspect of the present invention, there is provided a sound-adsorbing material prepared according to the preparation method provided by the present invention.

According to a further aspect of the present invention, there is provided a sound adsorbing material prepared from a non-foaming material, the sound adsorbing material being spherical granules.

Preferably, the spherical granules have a granule size of 0.10 to 10 mm.

The sound-adsorbing material preparation method provided by the present invention has simple operation and high reliability. Being formed by an oil column forming method, the resulting granules have high sphericity and a uniform granule size. The resulting particles formed by the sound-adsorbing material are uniform in size and have a smooth surface and high sphericity, and the granules are in contact with each other in points and piled up uniformly, which reduces the bed resistance and significantly improves the mass transfer efficiency and sound-adsorbing effect of the sound-adsorbing member. In addition, the high sphericity of the granules greatly reduces the wear rate between the granules. When used in a speaker (SPK), the problem of powdering due to the high-frequency vibration of the speaker (SPK) is solved.

The sound-adsorbing material provided by the present invention has the characteristics of high sphericity, uniform granule size, and smooth surface. The granules are in contact with each other in points and piled up uniformly, which reduces the bed resistance and significantly improves the mass transfer efficiency and sound-adsorbing effect of the sound-adsorbing member. Also, it is not easy to suffer from powdering during use.

The inventors of the present invention have found that the granules obtained by the prior art granulation methods of sound-adsorbing materials are poor in sphericity, non-uniform in size, and poor in granule strength. At present, there is no technical solution using the oil column forming method for the preparation of sound-adsorbing materials. Therefore, the technical task to be arrived at or the technical problem to be solved by the present invention is never conceived or expected by a person skilled in the art, so the present invention is a new technical solution.

Further features of the present invention and its advantages will become apparent from the following detailed description of exemplary embodiments of the present invention with reference to the attached drawings.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

Figure 1:
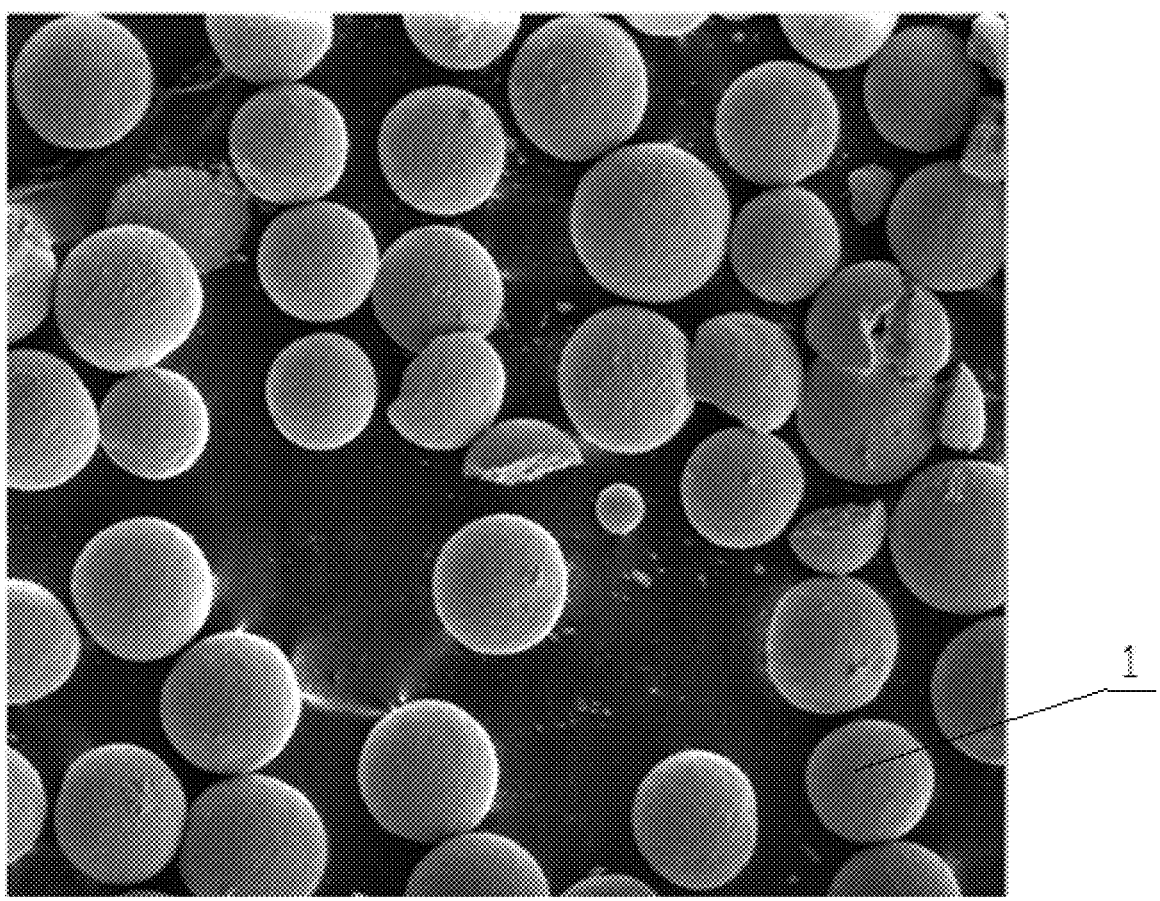
FIG. 1 is a scanning electron micrograph of a sound-adsorbing material according to an embodiment of the present invention.

"1" in the drawings represents sound-adsorbing material granules prepared according to an embodiment of the present invention; and "2" in the drawings represents sound-adsorbing material granules prepared according to a boiling granulation method.

DETAILED DESCRIPTION

Various exemplary embodiments of the present invention will now be described in detail with reference to the accompanying drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to be in any way limiting on the present invention, its application, or uses.

Techniques, methods, and devices known to one of ordinary skill in the relevant art may not be discussed in detail, but the techniques, methods and devices should be considered as part of the specification where appropriate.

In all examples shown and discussed herein, any specific value should be interpreted as illustration only and not as a limitation. Therefore, other examples of the exemplary embodiments may have different values.

It should be noted that like reference numerals and letters refer to similar items in the following figures, and therefore, once an item is defined in one figure, it need not be further discussed in subsequent figures.

This embodiment provides a sound-adsorbing material preparation method for preparing a sound-adsorbing material in a speaker (SPK). The preparation method includes the following steps.

In step S1, a non-foaming material slurry is prepared and mixed uniformly. Specifically, the non-foaming material slurry includes a binding agent, a non-foaming powder material, a template agent, and an activated carbon fiber. Of course, an auxiliary such as a dispersant, a humectant, or a surfactant may also be added to improve the quality of the slurry. The non-foaming powder material is one or more of natural zeolite powder, white carbon, activated carbon powder, and molecular sieves. Further, an effective solid content of the binding agent accounts for 1-35% by mass of the non-foaming material slurry. The purpose of adding the binding agent is to increase the viscosity of the slurry to form spherical granules better. One skilled in the art can set the mass ratio of the binding agent according to the type and viscosity of the binding agent. The template agent acts as a structural guide, and the mass ratio of the template agent is larger than 0 and equal to or less than 12%. The activated carbon fiber can form a diffusion pore structure after burning in the roasting process, which improves the specific surface area and pore volume of the sound-adsorbing material. The mass ratio of the activated carbon fiber is 0.1-15%. The length of the activated carbon fiber is 0.15-15 mm.

In this embodiment, the binding agent is an organosilicon sol-type binding agent, and the mass ratio of the binding agent is 12%. Zeolite powder with a silica-alumina mass ratio of 200 or more is used as the non-foaming powder material. The template agent has a mass ratio of 10%. The length of the activated carbon fiber is 0.15-15 mm, and its mass ratio is 10%. In this embodiment, an auxiliary such as a dispersant, a humectant, or a surfactant is also added to improve the quality of the slurry. Of course, one skilled in the art can add other auxiliaries as needed. The non-foaming material slurry is mixed to make the slurry uniform. Optionally, methods such as quantitative dropping and atomizing are used to add the binding agent to increase the uniformity of the slurry. Optionally, methods such as quantitative dropping and atomizing are used to add the auxiliary to increase the uniformity of the slurry. The amount of various raw materials added can be selected as needed.

In another embodiment of the present invention, the mass ratio of the binding agent is 1%. The non-foaming powder material is a mixture of natural zeolite powder, white carbon black, activated carbon powder and molecular sieves. The template agent has a mass ratio of 12%. The length of the activated carbon fiber is 0.15-15 mm, and its mass ratio is 15%. A non-foaming material slurry that meets the requirements is also prepared.

In yet another embodiment of the present invention, the mass ratio of the binding agent is 35%. The non-foaming powder material is a mixture of natural zeolite powder, white carbon black, activated carbon powder, and molecular sieves, and no template agent is added. The activated carbon fiber has a length of 0.15 to 15 mm and a mass ratio of 0.1%. A non-foaming material slurry that meets the requirements is also prepared.

In step S2, the non-foaming material slurry is formed by an oil column forming method to form wet granules. According to the actual situation, the forming oil may be one of lubricating oil, stator oil, machine tool oil, vacuum pump oil, and edible oil, or the forming oil may be a mixture of lubricating oil and aliphatic hydrocarbon. The oil temperature of the forming oil is 40-120° C. In the present embodiment, lubricating oil is used for the forming oil, and the oil temperature of the forming oil is 100° C.

In another embodiment of the present invention, stator oil is used for the forming oil, and the oil temperature of the forming oil is 40° C., which can also realize good forming.

In yet another embodiment of the present invention, machine oil is used for the forming oil, and the oil temperature of the forming oil is 120° C., which can also realize good forming.

In step S3, the wet granules are dried to form dry granules. Specifically, the drying is performed in air or an inert gas at a drying temperature of 40-150° C. and a drying time of 0.5-96 h. Those skilled in the art can easily conclude that the higher the drying temperature, the shorter the drying time; and correspondingly, the lower the drying temperature, the longer the drying time. Those skilled in the art can set the drying temperature according to actual conditions. In this embodiment, the drying is performed in nitrogen, the drying temperature is 90° C., and the drying time is 10 h.

In another embodiment of the present invention, the drying is performed in air at a drying temperature of 40° C. and a drying time of 96 h, which also achieves a good drying effect.

In a further embodiment of the present invention, the drying is carried out in air at a drying temperature of 150° C. and a drying time of 0.5 h, again achieving a good drying effect.

In step S4, the dry granules are roasted to form sound-adsorbing material granules. Specifically, the roasting temperature is 120-850° C., the heating rate is 20-120° C., and the roasting time is 0.5-96 h. Those skilled in the art can easily conclude that the lower the roasting temperature, the longer the roasting time; and correspondingly, the higher the roasting temperature, the shorter the roasting time. In this embodiment, the roasting temperature is 400° C., the heating rate is 50° C./h, and the roasting time is 20 h.

In another embodiment of the present invention, the roasting temperature is 120° C., the heating rate is 20° C./h, and the roasting time is 96 h, which also achieves a good roasting effect.

In yet another embodiment of the present invention, the roasting temperature is 850° C., the heating rate is 120° C./h, and the roasting time is 0.5 h, which also achieves a good roasting effect.

The sound-adsorbing material provided by the present invention is prepared according to the preparation method provided by the present invention.

The sound-adsorbing material provided by the present invention is prepared from a non-foaming material. The non-foaming material is superior to the foaming material in terms of acoustic performance gain. The sound-adsorbing material is spherical granules. The spherical granules have a granule size of 0.10 to 10 mm.

When used, the prepared sound-adsorbing material granules are packaged in a PP (polypropylene) tray or non-woven fabrics. Then, the encapsulated sound-adsorbing material granules are filled into a rear sound cavity of a speaker (SPK) to optimize the acoustic properties of the speaker (SPK) product. Of course, the prepared sound-adsorbing material granules can also be directly filled into the rear acoustic cavity.

In this embodiment, the prepared sound-adsorbing material is subjected to scanning electron microscope (SEM) detection. The scanning electron micrograph is shown in FIG. 1. The acoustic performance of a speaker (SPK) using this sound-adsorbing material is tested, see Table 1, in which the filling method is direct rear cavity filling.

Test items: response frequency after filling ($f_0$) and granule powdering after 96 h accelerated life test. Thirty specimens are tested for each sample and the test results are averaged.

Figure 2:
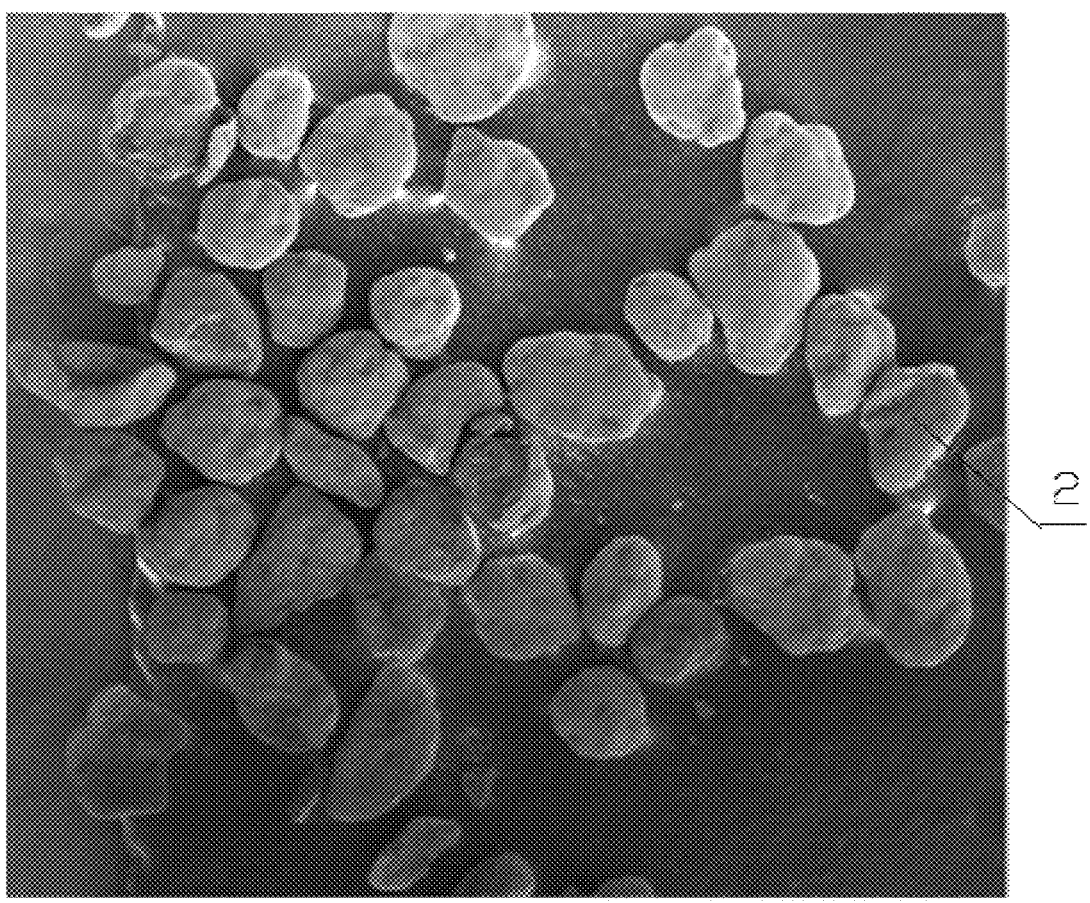
FIG. 2 is a scanning electron micrograph of a sound-adsorbing material prepared according to a boiling granulation method.

For comparison, a boiling granulation method is used for forming and granulation. The implementation methods of raw material proportion, mixing method, drying method, and roasting method are the same as those used in this embodiment. Scanning electron microscopy (SEM) detection is performed on the prepared material. The scanning electron micrograph is shown in FIG. 2. The acoustic properties of a speaker (SPK) using this material are tested, see Table 1, in which the filling method is direct rear cavity filling.

Test items: response frequency after filling ($f_0$) and granule powdering after 96 h accelerated life test. Thirty specimens are tested for each sample and the test results are averaged.

By comparison, we can see the followings.

1. Appearance (1) Referring to FIG. 1, sound-adsorbing material granules 1 obtained by the oil column forming method are uniform in size, have a smooth surface and high sphericity, and the granules 1 contact each other in points and are uniformly piled up, thereby reducing the bed resistance. This structure can significantly improve the mass transfer efficiency and sound-adsorbing effect of the sound-adsorbing member. In addition, the sphericity of the sound-adsorbing material granules 1 formed by oil column forming is high, which greatly reduces the wear rate among the granules 1 and solves the powdering problem of the sound-adsorbing material granules 1 due to high frequency vibration of the speaker (SPK) during use.

(2) Referring to FIG. 2, sound-adsorbing material granules 2 prepared according to the boiling granulation method have poor strength, poor sphericity, non-smooth surface, non-uniform granule size, and limited physical structure and performance. The granules 2 are piled up non-uniformly and rather tightly. It is difficult to form smooth pores between the granules 2, which will substantially increase the mass transfer resistance of the sound-adsorbing module as a whole. The high-frequency airflow generated during the operation of the speaker (SPK) product is difficult to smoothly enter and exit from the sound-adsorbing member composed of the sound-adsorbing material granules 2, which reduces the effective use of the sound-adsorbing member, making it difficult to achieve the desired acoustic performance tuning effect.

2. Acoustic Effect

TABLE 1

| Filling material type | No-filling sound-adsorbing material $f_0$/Hz | Filling sound-adsorbing material $f_0$/Hz | Response frequency difference $\Delta f_0$/Hz | Granule strength after 96 h accelerated life test | Speaker module |
|---|---|---|---|---|---|
| Boiling granulation | 996 | 913 | 83 | ≥50% granules broken | 1 |
| Oil column forming | 993 | 871 | 122 | No micro powder | 1 |

Referring to Table 1, it can be seen from the results of the acoustic effect test that the sound-adsorbing material prepared by the oil column forming method reduces the response frequency $f_0$ of the speaker (SPK) product. That is, the difference $\Delta f_0$ in the response frequency of the non-filling sound-adsorbing material and the filling sound-adsorbing material is 122 Hz. The boiling granulation method reduces the effect of the response frequency $f_0$ of the speaker (SPK) product, and $\Delta f_0$ is 83 Hz. The larger $\Delta f_0$, the better the sound-adsorbing effect. It can be seen that the sound-adsorbing effect of the sound-adsorbing material prepared according to the oil column forming method is obviously better than the sound-adsorbing effect of the materials prepared according to the boiling granulation method. Moreover, the sound-adsorbing material prepared according to oil column forming has no micro-powders and the granules are complete after 96 h accelerated life test. The material obtained by the boiling granulation method is broken by more than 50% of granules after 96 h accelerated life test, and the powdering phenomenon is serious. The sphericity of the granules formed by the sound-adsorbing material prepared by oil column forming is high, which greatly reduces the wear rate between the granules and solves the powdering problem of the sound-adsorbing granules caused by the high-frequency vibration of the speaker (SPK) during use.

The present invention provides a method for preparing a sound-adsorbing material. A non-foaming sound-adsorbing powder material, a binding agent, a template agent, an activated carbon fiber, an auxiliary and the like are prepared into a uniform slurry according to the proportion. The oil column forming method is adopted to form granules. After drying and roasting, a sound-adsorbing material in the final form is obtained.

The sound-adsorbing material prepared by the oil column forming method has a uniform granule size, a smooth surface and high sphericity. The granules are in contact with each other in points and piled up uniformly, which reduces the bed resistance and significantly improves the mass transfer efficiency and sound-adsorbing effect of the sound-adsorbing member. The granules formed by the sound-adsorbing material prepared according to the oil-column forming method have a high sphericity, which greatly reduces the wear rate between granules and solves the powdering problem of the sound-adsorbing material caused by the high-frequency vibration of the speaker (SPK) during use.

During the forming process, a diffusion pore structure matched with the millisecond-scale adsorption-desorption reaction is obtained by controlling the mixing ratio of the non-foaming powder material and the binding agent, the formulation process, and the combination of drying time and temperature. According to the application test results of the sound-adsorbing material in speaker (SPK) products, it can be seen that under the action of the template agent, the sound-adsorbing material can generate a rich mesoporous structure, and the activated carbon fiber can be burned through roasting to obtain a smoother diffusion pore structure. Simultaneously, the specific surface area and pore volume of the sound-adsorbing material are improved, and the adsorption and desorption reaction efficiency and mass transfer efficiency of the air molecules in the sound-adsorbing material are improved, which avoids secondary adverse reactions caused by the retention of heteroatoms and even the failure of the sound-adsorbing material.

The sound-adsorbing material provided by the present invention has the characteristics of high sphericity, a uniform granule size, and a smooth surface. The granules are in contact with each other in points and piled up uniformly, which reduces the bed resistance and significantly improves the mass transfer efficiency and sound-adsorbing effect of the sound-adsorbing member. Also, it is not easy to suffer from powdering during use.

Although some specific embodiments of the present invention have been described in detail by way of example, it will be understood by those skilled in the art that the above examples are for illustrative purposes only and are not intended to limit the scope of the present invention. It should be understood by those skilled in the art that the above embodiments may be modified without departing from the scope and spirit of the present invention. The scope of the present invention is defined by the appended claims.

The invention claimed is:

1. A method for preparing a sound-adsorbing material, comprising the steps of:
   S1, preparing a non-foaming material slurry and mixing the slurry uniformly, the non-foaming material slurry comprises a binding agent, a non-foaming powder material, and an activated carbon fiber, the binding agent is an organosilicon sol-type binding agent, the non-foaming powder material is zeolite powder having a silica-alumina mass ratio of 200 or more;
   S2, forming the non-foaming material slurry using an oil column forming method to form wet granules;
   S3, drying the wet granules to form dry granules; and
   S4, roasting the dry granules to form sound-adsorbing material granules.

2. The method for preparing a sound-adsorbing material according to claim 1, wherein the non-foaming material slurry comprises an auxiliary, and the auxiliary is a dispersant, a humectant, or a surfactant.

3. The method for preparing a sound-adsorbing material according to claim 1, wherein the binding agent is added by a quantitative dropping or atomizing method to increase the uniformity of the slurry.

4. The method for preparing a sound-adsorbing material according to claim 2, wherein the auxiliary is added by a quantitative dropping or atomizing method to increase the uniformity of the slurry.

5. The method for preparing a sound-adsorbing material according to claim 1, wherein an effective solid content of the binding agent accounts for 1-35% by mass of the non-foaming material slurry.

6. The method for preparing a sound-adsorbing material according to claim 1, wherein the mass ratio of the activated carbon fiber is 0.1-15%, and the length of the activated carbon fiber is 0.15-15 mm.

7. The method for preparing a sound-adsorbing material according to claim 1, wherein the activated carbon fiber has a mass ratio of 10%.

8. The method for preparing a sound-adsorbing material according to claim 1, wherein the forming oil used in the oil column forming method is one of lubricating oil, stator oil, machine tool oil, vacuum pump oil, and edible oil, or the forming oil is a mixture of lubricating oil and aliphatic hydrocarbon.

9. The method for preparing a sound-adsorbing material according to claim 1, wherein
   in the step S2, the oil temperature of the forming oil is 40-120° C.;
   in the step S3, the drying is carried out in air or an inert gas, the drying temperature is 40-150° C., and the drying time is 0.5-96h; and
   in the step S4, the roasting temperature is 120-850° C., the heating rate is 20-120° C./h, and the roasting time is 0.5-96h.

10. The method for preparing a sound-adsorbing material according to claim 9, wherein the drying is performed in nitrogen, the drying temperature is 90° C., and the drying time is 10h.

11. The method for preparing a sound-adsorbing material according to claim 9, wherein the oil temperature of the forming oil which is a lubricating oil is 100° C.

12. The method for preparing a sound-adsorbing material according to claim 9, wherein the roasting temperature is 400° C., the heating rate is 50° C./h, and the roasting time is 20h.

* * * * *